United States Patent

Sordello

[15] 3,694,772

[45] Sept. 26, 1972

[54] VOLTAGE CONTROL SAWTOOTH OSCILLATOR WITH FLYBACK TIME INDEPENDENT OF FREQUENCY

[72] Inventor: Frank J. Sordello, San Jose, Calif.

[73] Assignee: Information Storage Systems, Inc., Cupertino, Calif.

[22] Filed: April 12, 1971

[21] Appl. No.: 133,219

[52] U.S. Cl. ..............331/111, 331/36 C, 331/177 R

[51] Int. Cl. ..............................H03b 3/04, H03k 4/50

[58] Field of Search .................331/111, 177 R, 36 C

[56] References Cited

UNITED STATES PATENTS 3,376,518 4/1968 Emmer......................331/111

3,559,098 1/1971 Chandos...................331/111

*Primary Examiner*—Roy Lake

*Assistant Examiner*—Siegfried H. Grimm

*Attorney*—Gerald L. Moore and Robert B. Crouch

[57] ABSTRACT

This invention involves an electrically frequency-variable oscillator of the type which can be adjusted to vary the characteristics of both the sawtooth wave and rectangular wave generated.

8 Claims, 4 Drawing Figures

PATENTED SEP 26 1972

3,694,772

INVENTOR.
FRANK J. SORDELLO
BY Gerald L Moore
ATTORNEY

INVENTOR
FRANK J. SORDELLO
BY Gerald L Moore
ATTORNEY

VOLTAGE CONTROL SAWTOOTH OSCILLATOR WITH FLYBACK TIME INDEPENDENT OF FREQUENCY

BACKGROUND OF THE INVENTION

1. Field of the Invention

The invention relates to a sawtooth/rectangular-wave generator in which the time-symmetry of the wave can be varied independently of frequency, the frequency can be varied independently of time-symmetry. The flyback and flydown times of the sawtooth can be varied relative to one another without varying the frequency of the oscillator.

2. Description of the Prior Art

Oscillators of the variable frequency type are used in such installations as in data processing systems for synchronizing circuits to accommodate the reading and processing of data conveying signals. While other uses for such oscillators exist, they are used especially in this instance because various gating circuits must be controlled to separate data signal pulses from clock signal pulses in a data separator while transmitting and reading various data signals.

Double frequency encoding of digital data such as that found on disk drive packs requires that data be separated (clock pulses from data pulses) in order that the readback data can be further processed by a computation system. The bit-shift characteristics of double-frequency magnetic readback are such that clock pulses may be shifted ± 30 percent more than data pulses for a given readback pattern. Hence it is the function of a data separator system to not only identify clock cell times and data cell times, but also generate a "window" gate that allows a greater effective clock cell time than effective data cell time.

In such systems, there exists the need to vary the time-symmetry of each cycle since these times are used to key the data and clock pulse gates. In the past, one such oscillator widely used has comprised a sawtooth wave generator used in cooperation with level detectors, which detectors were varied to give the effect of varying the time-symmetry of various signals of the oscillator. However, such prior art devices have required a plurality of adjustments by the operator or customer engineer with each adjustment sometimes being interrelated with the other to reach a desired result since the changing, for instance, of one level detector to change either the leading edge time-symmetry or trailing edge time-symmetry invariably results in the altering of the other adjustment. If an attempt were made to adjust the actual ramp of the flydown or flyback portion of the sawtooth signal, the frequency and possibly the amplitude of the signal was also varied. Therefore, any attempt to adjust those parameters of the signal resulted in varying other portions of the signal which it was not desired to alter.

It is the object of the subject invention to permit the varying of various characteristics of the sawtooth/rectangular wave variable-frequency oscillator in a manner not permitted with prior art devices of this type.

SUMMARY OF THE INVENTION

This invention comprises an oscillator having a charge storage means, first and second circuits for charging and discharging the charge storage means respectively, switching means for controlling the energizing times of the circuits and current control means to regulate the current flows in both circuits in a manner such that an increase or decrease in one circuit will result respectively in a decrease or increase in the current flow of the other circuit, thereby permitting an adjustment of the charge and discharge of flyback and flydown timing sequences of the oscillator while the frequency of the signal generated by the oscillator remains unaltered. Also, the frequency can be varied without affecting the time-symmetry. The time-symmetry is varied by one adjustment.

DESCRIPTION OF A PREFERRED EMBODIMENT OF THE INVENTION

Figure 1:
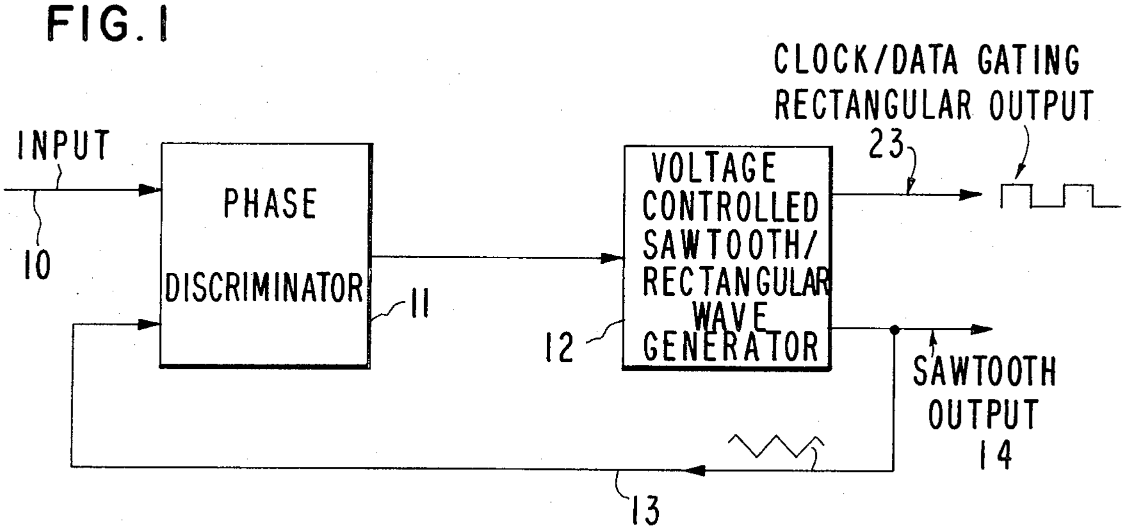
FIG. 1 shows a data separator of a type in which the subject invention can be incorporated.

As an example of one application of the invention, FIG. 1 is shown in which an input signal is received into such a device as a computer or control unit wherein the input signal comprises a series of clocking and data pulses. The input signal is "raw readback data" pulses and is fed into the line 10 to a phase discriminator 11. The output signal from the phase discriminator is the analog control voltage and is fed to the oscillator which causes the oscillator to phase-lock with the input signal. The oscillator is the subject of this invention and provides a sawtooth feedback signal through the line 13 to the phase discriminator. The phase lock loop is similar to ones found in the horizontal oscillators of common television sets and locks to the average time position (phase) of the incoming pulses. The sawtooth signal is used to generate a rectangular output serving as gates or "windows" which open at the times when data or clocking pulses are to be received such that these pulses can be discriminated from each other. Thereafter, the output signals are fed through the lines 14 and 23 to the logic apparatus separating the data and clocking information.

Figure 2:
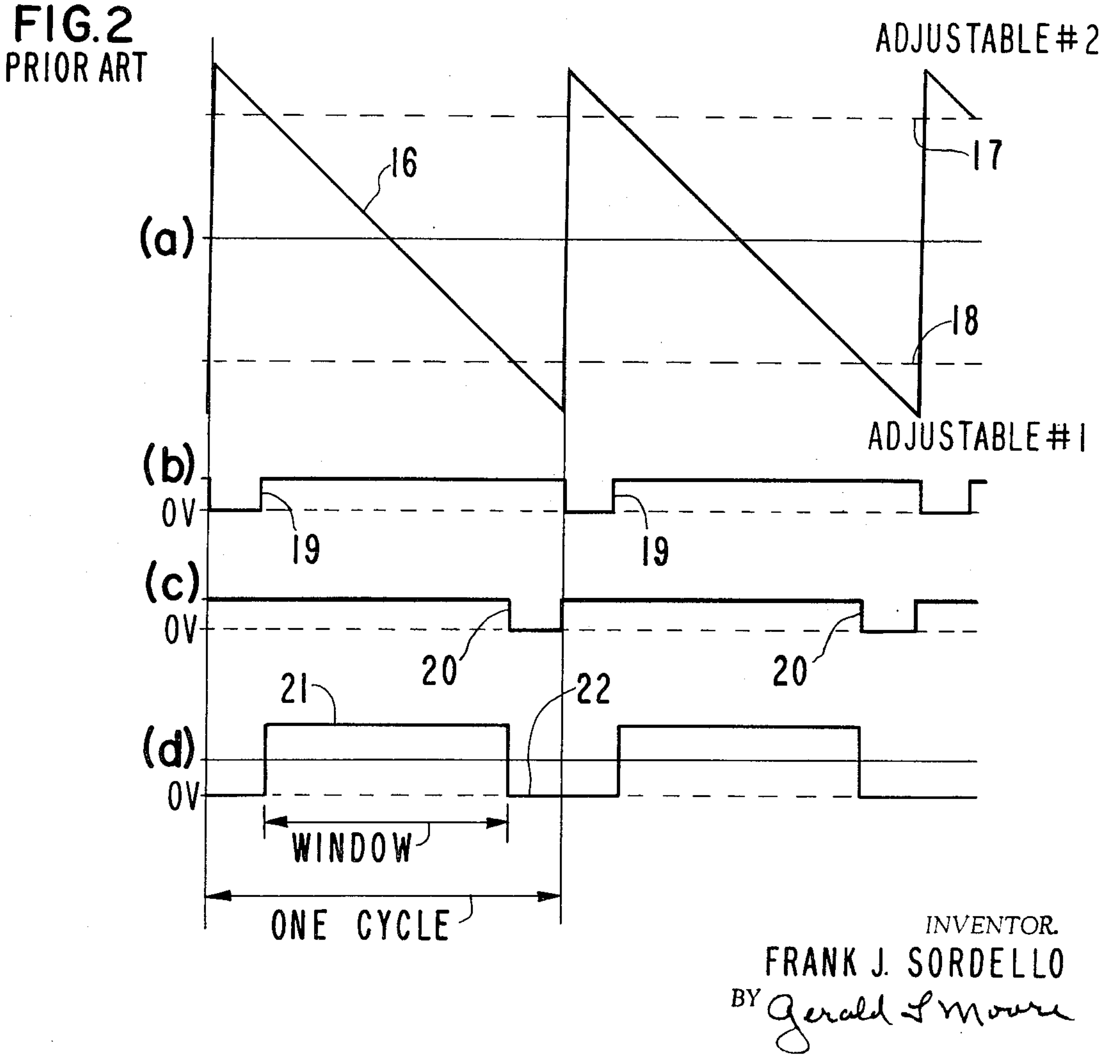
FIG. 2 PRIOR ART
FIG. 2 shows a type of output signals generated in prior art devices.

As one example of the prior art, a standard sawtooth wave generator was utilized extensively to generate the wave 16 shown in FIG. 2, which in turn was also fed back to the phase discriminator. Standard level detectors well known in the art were utilized for the purposes of detecting when the signals reached maximum and minimum amplitudes as indicated by the dotted lines 17 and 18. Thus, gates could be opened in response to the signals *b* and *c* generated respectively when the sawtooth wave exceeded the positive level detector represented by the pulses 19 and when the signal reached a negative value exceeding the lower level detector represented by the pulses 20. A gating signal can be developed with the logical processing of the signals *b* and *c*, which is represented by the signal *d* such that the window was detected during the up portion of the cycle which is generated amid the sawtooth cycle.

However, disadvantages are derived from such circuitry in that the adjustment of the levels 17 and 18 of the level detector must be made by two separate adjustments. Therefore, if one desired to adjust the window pulse detecting time of the circuit *d*, two adjustments must be made, thereby increasing servicing time and adding complexity and possible confusion to the adjustor. Note also the flyback must be as fast as possible to prevent gaps from occurring during the flyback time between the threshold levels. Since a large amount of energy must be dissipated during the period, such generators are extremely noisy and thus can affect the data signal being read. Additionally with shifted bits occurring near the window edge, the sawtooth is at a maximum value, thereby tending to emphasize the bit, rather than de-emphasize, to the phase-lock loop, it as an erroneous bit, which frequently is the case.

Figures 3, 4:
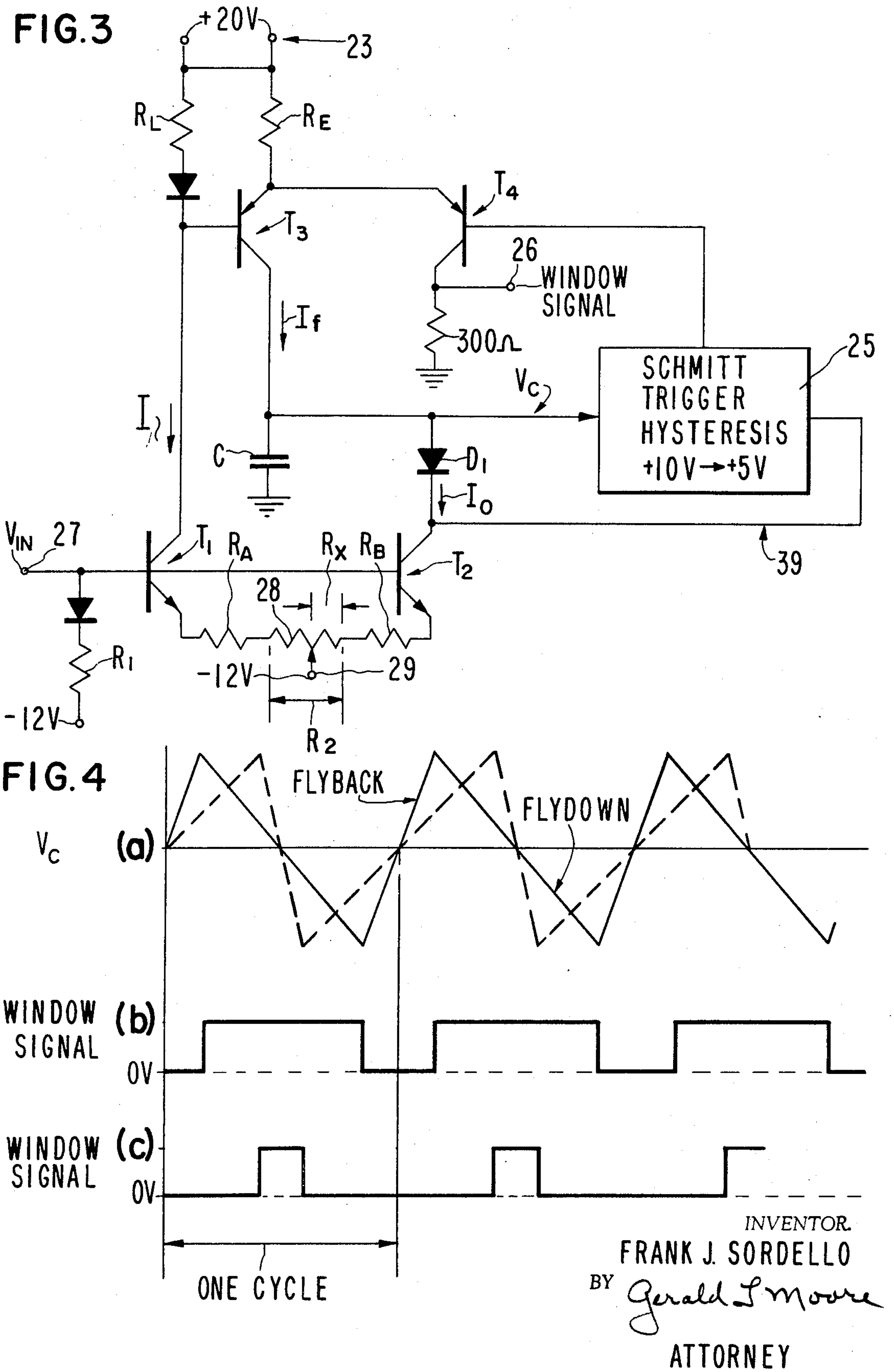
FIG. 3 is a schematic of the oscillator embodying the subject invention.
FIG. 4 shows the waves generated in the subject invention, which wave characteristics can be varied in the manner shown.

The invention is shown embodied in FIG. 3 and generally comprises a charge storage means or capacitor C, which receives a flyback charging current $I_f$ through the transistor $T_3$ and is discharged by flow of the current $I_o$ through the circuit including the diode $D_1$. The cycling of the flyback and flydown currents is controlled by the Schmitt trigger 25 which operates such that when $V_c$, the voltage of the capacitor reaches +5 volts, the Schmitt trigger turns off the transistor $T_4$. When $T_4$ turns off, $T_3$ is turned on, which initiates the flow of the flyback current $I_f$ to the capacitor C. The capacitor voltage $V_c$ then increases in accordance with the current flow through the transistor $T_3$ until it reaches a value of +10 volts. At that point, the Schmitt trigger changes state, resulting in the turning on of $T_4$ and the turning off of $T_3$. During this period, the capacitor C is discharged by the flow of the current $I_o$ through the diode $D_1$ and the transistor $T_2$. When transistor $T_3$ is turned on, the diode $D_1$ is back-biased by line 39 out of the Schmitt trigger.

Thus, a window signal is generated at the terminal 26 corresponding to the signal shown in the FIG. 4(*b*). This signal is representative of the current flow through $T_4$ which turns on and off with the Schmitt trigger. Note that the window signal is centered about the sawtooth cycle also. The window signal in FIG. 4(*b*) is derived from the sawtooth waveform shown in FIG. 4(*a*) in solid line form. With the waveform shown in dotted line in FIG. 4(*a*), the window signal in FIG. 4(*c*) is generated. Thus, by changing the flyback and flydown times of the sawtooth wave, the window signals are proportionally changed.

In accordance with the present invention, the frequency of the waveform of the oscillator is changed by adjustment of a single input to the generator. The slopes of the ramps signal are controlled by regulation of the level of the voltage $V_{in}$ at the terminal 27. This voltage is applied to the base of the transistors $T_1$ and $T_2$. The transistor $T_1$ controls the current $I_1$ flowing from the +20 volt terminal 23 and thereby regulates the voltage drop across the resistor $R_L$. Accordingly, the greater the current $I_1$, the greater the voltage drop across the resistor $R_L$ and the lower the voltage of the base of the transistor $T_3$, thereby tending to turn the transistor on more. With the increase in current through $T_3$, the current $I_f$ increases in magnitude and the capacitor C is charged at a faster rate. Also, by the control of the base voltage of the transistor $T_2$, the amplitude of the current $I_o$ is similarly regulated by the value of the voltage $V_{in}$. Thus, for a selected frequency of the oscillator, the amplitude of the currents $I_f$ and $I_o$ is regulated by adjustment of the voltage $V_{in}$. Note that the amplitude of the sawtooth is constant as controlled by the 5 volt hysteresis of the Schmitt trigger. It should be noted that generation of the window generating sawtooth waveform in the manner shown rather than in the manner illustrated in FIG. 2 of the prior art, permits the phase discriminator to de-emphasize the bits that are violently shifted within the input signal. This result occurs since the sawtooth form is diminishing in amplitude past the window edges whereas in the prior art device described heretofore, the waveform was at an extreme value past the window edges.

As a further feature of the subject invention, the regulation of the position of the pointer 29 on the rheostat 28 controls the relative sizes of the currents $I_f$ and $I_o$ which in turn determine the slope of the ramps represented as flyback and flydown voltages of the capacitor. Additionally, the control of the relationship of these flyback and flydown currents does not affect the frequency of the oscillator as will be shown hereinafter. Accordingly, the control of the pointer 29 regulates the relative sizes of the resistance $R_X$ to the total resistance $R_2$ of the rheostat 28. Fixed resistors $R_A$ and $R_B$ are likewise connected in the series circuit between the emitters of the transistors $T_1$ and $T_2$ and are selected for a coarse range of the ratio of $I_f$ to $I_o$. Thus, an increase in the base voltage of the transistor $T_1$ results in an increase in the emitter current of the transistor $T_3$ since the current $I_1$ increases, which in turn further results in an increased flyback current $I_f$. At the same time the increased voltage of the base $T_2$ results in a higher flydown current $I_o$ during the same cycle of the oscillator.

As will be seen in the following electrical derivation of the circuit equations, the frequency of the oscillation of the subject invention is not affected by the relative sizes of the resistors $R_X + R_B$ to resistors $R_2 - R_X + R_A$ but instead is affected only by the voltage $V_{in}$, while the "window" signal or flyback and flydown current times ratio depends upon the value of resistors $R_X + R_B$ with respect to resistors $R_2 - R_X + R_A$ and not upon the voltage $V_{in}$.

Therefore, it can be seen that the voltage across the capacitor at the input to the Schmitt trigger will be a never-ending sawtooth as shown in FIG. 4(*a*)

Define:

I through capacitor $\triangleq C(\Delta V/t)$ $\Delta V \triangleq$ 5 volt - Hysteresis of Schmidt trigger $\Delta tf \triangleq$ Flyback time of $V_c = C\,\Delta V/I_f$ $I_f \triangleq$ Flyback current into $C$ $C \triangleq$ Capacitor value $\Delta td =$ Flydown time of $V_c = C\,\Delta\, V/I_o$ $I_o \triangleq$ Flydown current out of $C$ $T \triangleq$ period of one cycle of oscillation $T \triangleq \Delta tf + \Delta td$ $f =$ frequency of oscillation $= 1/T$ $T = (C\Delta V/I_f) + (C\,\Delta\, V/I_o)$ For this design . . . $\Delta V = 5$ volt $$T = C\Delta V\left(\frac{1}{I_f} + \frac{1}{I_o}\right) = C\Delta V\,\frac{I_o + I_f}{I_f I_d}$$

Equation I.

$$f=\left(\frac{1}{C\Delta V}\right)\left(\frac{I_f I_o}{I_f+I_o}\right)$$

From circuit of FIG. 3, it can be seen that . . .
If $V_{in}$ is measured with respect to −12 volts . . .

$$I_1=\left(\frac{V_{in}}{R_A+R_2-R_X}\right)\alpha 1$$

$\alpha 1 \triangleq$ Alpha of transistor 1
$B_3 \triangleq$ Beta of transistor 3

$$I_f=I_1\left(\frac{B_3}{B_3+2}\right)\frac{R_L}{R_E}=\left(\frac{V_{in}\alpha 1}{R_A+R_2-R_X}\right)\left(\frac{B_3}{B_3+2}\right)\frac{R_L}{R_E}$$

And $$I_o=\frac{V_{in}\alpha 2}{R_B+R_X}$$

$\alpha 2 \triangleq$ Alpha of transistor 2
If one designs $$\left(\frac{R_L}{R_E}\right)\left(\frac{B_3}{B_3+2}\right)=\alpha 2=K$$

K $\triangleq$ a design constant
Then $$I_f=\frac{V_{in}K}{R_A+R_2-R_X}$$

And $$I_o=\frac{V_{in}K}{R_B+R_X}$$

Define $R=R_A+R_2+R_B$ = total resistance between emitters of $T_1$ and $T_2$.
Then $R_A+R_2=R-R_B$ $$I_f=\frac{V_{in}K}{R-R_B-R_X}$$

Substituting into EQ I . . .

$$f=\frac{1}{C\Delta V}\left(\frac{V_{in}K}{R-R_B-R_X}\right)\left(\frac{V_{in}K}{R_B+R_X}\right)$$

$$=\frac{V_{in}K}{C\Delta K}\,\frac{1}{R_B+R_X+R-R_B-R_X}\,\frac{V_{in}K}{R-R_B-R_X}+\frac{V_{in}K}{R_B+R_X}$$

Equation II.

$$f=\frac{1}{C\Delta V}\,\frac{V_{in}K}{R_B+R_X+R-R_B-R_X}=\frac{V_{in}K}{C\Delta V}\left(\frac{1}{R}\right)$$

Equation II shows that the frequency is controlled by $V_{in}$ and does not depend upon the apportionment of the values comprising R. When $T_4$ turns on, the + window signal appears across the 300 Ω resistor. Hence the + window signal is "up" during $\Delta td$.

The window signal lasts for $\Delta td$ out of period T $$\%\ \text{window}=\frac{\Delta td}{T}=\frac{\Delta td}{\Delta tf+\Delta td}$$

$$=\frac{\frac{C\Delta V}{I_o}}{\frac{C\Delta V}{I_f}+\frac{C\Delta V}{I_o}}=\frac{\frac{1}{I_o}}{\frac{1}{I_f}+\frac{1}{I_o}}$$

$$=\frac{\frac{I_f I_o}{I_o}}{I_o+I_f}=\frac{I_f}{I_o+I_f}=\frac{\frac{V_{in}K}{R-R_B-R_X}}{\frac{V_{in}K}{R-R_B-R_X}+\frac{V_{in}K}{R_B+R_X}}$$

$$\%\ \text{window}=\frac{R_B+R_X}{R-R_B-R_X+R_B+R_X}=\frac{R_B-R_X}{R}$$

Equation III.

$$\%\ \text{window}=(R_B+R_X)/R$$

Equation III shows that the percentage of a cycle representing the window with respect to the total period can be varies by adjusting the resistance value $R_X$ and does not depend upon the voltage $V_{in}$. To summarize the primary advantages of the subject invention:

1. The frequency of the oscillator depends upon the amplitude of the voltage $V_{in}$ and not on the apportionment of R.
2. The window signal depends upon the apportionment of R and not the voltage $V_{in}$. The frequency may be varied by changing $V_{in}$ without changing the window, and the window may be varied by changing $R_X$ without shifting the frequency of the oscillator.
3. The slow flyback of the sawtooth wave generated by the invention is much more electrically quiet than the faster or instantaneous flyback of the prior art sawtooth wave generator shown in FIG. 2A. This is a very important practical advantage.

The invention claimed is:

1. An oscillator comprising
a charge storage means,
a first circuit for charging said charge storage means,
a second circuit for discharging said charge storage means,
switching means in each of said circuits controlled to be alternately turned off and on relative to each other and at the frequency it is desired the oscillator operate,
current control means operable to regulate the current flow in both circuits in a manner that an increase or decrease in current level in one circuit will be accompanied by a corresponding decrease or increase respectively in the other circuit, and
means to detect the charge state of the charge storage means thereby to generate a sawtooth output signal of the oscillator having flyback and flydown characteristics.

2. An oscillator as defined in claim 1 wherein said current control means comprises a transistor in each circuit having adjustable voltage bias means for regulating the current flow therethrough.

3. An oscillator as defined in claim 2 wherein said transistors in said circuits have a resistor connected between the respective emitters having a center tap adjustable such that the increase in resistance between the center tap and one emitter decreases the resistance between the tap and the other emitter by a comparable amount.

4. An oscillator as defined in claim 3 wherein said transistors have a common base connection.

5. An oscillator as defined in claim 4 including means to alter the base voltage of said transistors concurrently thereby to regulate the charging rate of the circuits and vary the frequency of oscillation of the oscillator.

6. An oscillator as defined in claim 1 wherein said charge storage means comprises a capacitor.

7. An oscillator as defined defined in claim 6 wherein said current control means comprises a transistor in each circuit having common base connections and means to vary the voltage at said transistor bases thereby to regulate the rates of charging and discharging concurrently to vary the frequency of operation of the oscillator.

8. An oscillator as defined in claim 7 including a resistor connected in series between the emitters of said transistors, said resistor having a single movable center tap connected to a source of potential such that movement of the tap in either direction will concurrently increase the current flow in one circuit while decreasing the current flow in the other circuit, thereby to vary the flyback and flydown characteristics of the sawtooth wave generated.

* * * * *